United States Patent
Casey (10) Patent No.: US 10,620,816 B2
(45) Date of Patent: Apr. 14, 2020

(54) SYSTEM FOR DISPLAYING ELEMENTS OF A SCROLLABLE LIST

(71) Applicant: salesforce.com, inc., San Francisco, CA (US)

(72) Inventor: Colin Casey, Quispamsis (CA)

(73) Assignee: salesforce.com, inc., San Francisco, CA (US)

(*) Notice: Subject to any disclaimer, the term of this patent is extended or adjusted under 35 U.S.C. 154(b) by 284 days.

(21) Appl. No.: 15/290,597

(22) Filed: Oct. 11, 2016

(65) Prior Publication Data

US 2018/0101295 A1    Apr. 12, 2018

(51) Int. Cl.
| | |
|---|---|
| G06F 3/048 | (2013.01) |
| G09G 5/34 | (2006.01) |
| G06F 3/0485 | (2013.01) |
| G06F 3/0482 | (2013.01) |

(52) U.S. Cl.
CPC ........ G06F 3/04855 (2013.01); G06F 3/0482 (2013.01); G06F 3/0485 (2013.01); G09G 5/34 (2013.01); G09G 2340/14 (2013.01)

(58) Field of Classification Search
CPC .. G06F 3/04855; G06F 3/0485; G06F 3/0482; G09G 2340/14; G09G 5/34
See application file for complete search history.

(56) References Cited

U.S. PATENT DOCUMENTS

| | | | | |
|---|---|---|---|---|
| 4,414,628 A * | 11/1983 | Ahuja | ................... | H04N 1/3873 345/537 |
| 4,744,046 A * | 5/1988 | Foster | ..................... | G09G 5/343 345/28 |
| 7,100,112 B1 * | 8/2006 | Winser | ................. | G06F 17/2247 715/210 |
| 8,307,278 B1 * | 11/2012 | Spear | ................... | G06F 16/9577 715/240 |
| 8,832,086 B1 * | 9/2014 | Zhang | ............... | G06F 17/30991 705/346 |
| 8,935,620 B1 * | 1/2015 | Cox | ....................... | G06F 3/0483 709/203 |
| 2002/0126154 A1 * | 9/2002 | Watson | ................. | G06F 3/0485 715/784 |
| 2007/0198476 A1 * | 8/2007 | Farago | .................. | G06F 3/0485 |

(Continued)

OTHER PUBLICATIONS http://docs.sencha.com/extjs/4.2.4/extjs-build/examples/grid/infinite-scroll.html.
https://github.com/NeXTs/Clusterize.js.

*Primary Examiner* — Stephen S Hong
*Assistant Examiner* — Ahamed I Nazar
(74) *Attorney, Agent, or Firm* — Morris & Kamlay LLP (57) ABSTRACT

Provided are techniques for displaying, on a display, a scrollable list of items. In an example, items to be displayed are grouped in pages in buffers. Items to be rendered are selected to be rendered by a scroll input. Items in a current buffer are rendered. Items in no more than one buffer are rendered at a time. An actual height, in pixels, of each of the pages grouped in the current buffer is calculated and the result is stored. A respective estimate of a height, in pixels, of pages grouped in buffers other than the current buffer is determined. A total height of all pages is calculated from the calculated actual height or estimated height of each respective page. A scroll bar's slider is rendered, with the scroll bar slider's size based on the total height.

30 Claims, 5 Drawing Sheets (56) References Cited

U.S. PATENT DOCUMENTS

| | | | |
|---|---|---|---|
| 2010/0162126 A1* | 6/2010 | Donaldson | G06F 17/30902 |
| | | | 715/738 |
| 2011/0264650 A1* | 10/2011 | Tobin | G06F 16/248 |
| | | | 707/722 |
| 2012/0011430 A1* | 1/2012 | Parker | G06F 3/0485 |
| | | | 715/234 |
| 2013/0007590 A1* | 1/2013 | Rivera | G06F 3/0481 |
| | | | 715/234 |
| 2014/0081903 A1* | 3/2014 | Koosel | G06F 16/254 |
| | | | 707/602 |
| 2014/0208259 A1* | 7/2014 | Desai | G06F 3/04883 |
| | | | 715/784 |
| 2015/0066907 A1* | 3/2015 | Somaiya | G06F 3/0485 |
| | | | 707/722 |

* cited by examiner

SYSTEM FOR DISPLAYING ELEMENTS OF A SCROLLABLE LIST

BACKGROUND

Computer users demand performance. Thus, user-perceived performance often is a priority in applications. Using conventional techniques, when an application attempts to render a large or very long scrollable list of items, rendering processes and interactions can overload processing hardware. The overload occurs because, for example, items that are not displayed but are in the list, and thus might be displayed, are processed by at least a part of the rendering processes in anticipation of being displayed. The overloading can occur due to rendering, accessing, or otherwise processing a high number of document object model (DOM) items in the scrollable list, such as during a refresh operation, query, etc. Thus, a tremendous quantity of processing of non-displayed items occurs, while the user device displays only a small portion of the items. As a result, when a user very quickly scrolls through a list, demands of the rending processes, such as browser refreshing, can exceed a video processing capacity of the user device, a data processing capacity of the user device, or both. Overload can occur when scrolling through "online" lists, in which items are delivered over a network such as the Internet. Thus, the user perceives poor performance of the related application, such as a long load time, sluggish operation, inability to keep up with very fast scrolling, etc. This can result in the user disliking the application and/or choosing to use a competing application.

BRIEF DESCRIPTION OF THE DRAWINGS

The accompanying drawings, which are included to provide a further understanding of the disclosed subject matter, are incorporated in, and constitute a part of, this specification. The drawings also illustrate examples of the disclosed subject matter, and together with the detailed description, serve to explain the principles of examples of the disclosed subject matter. No attempt is made to show structural details in more detail than may be necessary for a fundamental understanding of the disclosed subject matter and various ways in which the disclosed subject matter can be practiced.

DETAILED DESCRIPTION

Provided are techniques for displaying a scrollable list of items on a display. Examples of scrollable lists include but are not limited to spreadsheets, collections of web posts, social media feeds, streams of postings as content, any relatively large list of items displayed on a web page (or similar interface), the like, or any combination thereof.

The provided techniques address the aforementioned issues which occur when using conventional techniques. In an example, the provided techniques do not perform a rendering process on items that are not displayed. Instead, rendering processes are performed on a smaller, manageable portion of document object model (DOM) content that is displayed. In other words, the provided techniques, which can also be referred to as virtualized rendering, manage the rendering process by keeping a number of DOM nodes attached to a page relatively low and swapping out visible items as a user scrolls. In examples, this can give rendering speeds at around 60 frames per second (fps) for lists having 10,000 items or more.

In an example, provided is a technique for displaying, on a display, a scrollable list of items stored in a list container. The technique can include four parts. A first part includes grouping individual items, to be rendered, into pages. The grouping aggregates and caches rendering details such as a height of the items in a respective page, etc. A second part includes grouping the pages into buffers and rendering a current buffer. The current buffer is a buffer being rendered. The buffers are used to support bulk DOM operations. The buffers can be useful for rendering smooth scrolling. A third part includes estimating a total height of the items to be rendered and adding empty spacer (e.g., <div>) elements to the top and bottom of the list container. Adding the spacer elements gives an appearance that all of the items are being rendered. A fourth part includes monitoring scrolling events to determine which buffer should currently be rendered into view. In an example, the items in only one buffer are rendered at one time. Render-related processing is not performed on items that are not currently displayed. This keeps a number of DOM nodes attached to a page low and swaps out visible items during scrolling.

The provided techniques also address rendering a scroll bar's slider size. In an example, a longer list has a respective slider that has less area displayed than a respective slider of a shorter list. When displaying the smaller, manageable portion of DOM content, the slider that is displayed has a size substantially corresponding to a total height of substantially the entire list of items instead of a size corresponding to only the smaller portion. As a non-limiting example, if the entire list has 10,000 items and only 100 items from the entire list are displayed, the displayed slider is sized based on a substantially total height of the 10,000 items, instead of being sized based on the height of the 100 items. Sizing the displayed slider in this manner can be accomplished by setting a height of a container including the items to an approximate total height of substantially all items in the container. Thus, the slider (or a similar control) can provide a more accurate indication of a number of items in a list to a user, without requiring a computer system to actually render the entire list of items, thereby making the system more efficient at handling and presenting such a list of items. Further details of this technique are provided hereby with reference to FIGS. 1 and 3A-3D.

In examples, the provided techniques provide several advantages. The provided techniques can be implemented as a standalone plugin that could be used within any component, can provide smooth scrolling for large list views, can be configurable by consumers of the plugin, can integrate seamlessly with infinite scrolling lists, or a combination thereof. The provided techniques can allow fixed height items to be accurately rendered, can allow dynamic height items to be accurately rendered, can respond to height changes which may occur (e.g., due to user interactions, image loading, etc.), or a combination thereof. The provided techniques can also increase perceived speed of the application, increase web browser efficiency, reduce work performed by a web browser, save central processing unit cycles, save energy, or a combination thereof. Thus, the disclosed methods and apparatuses can advantageously and beneficially improve on conventional techniques, and can improve functioning of a machine performing rendering of a scrollable list.

Figure 1A:
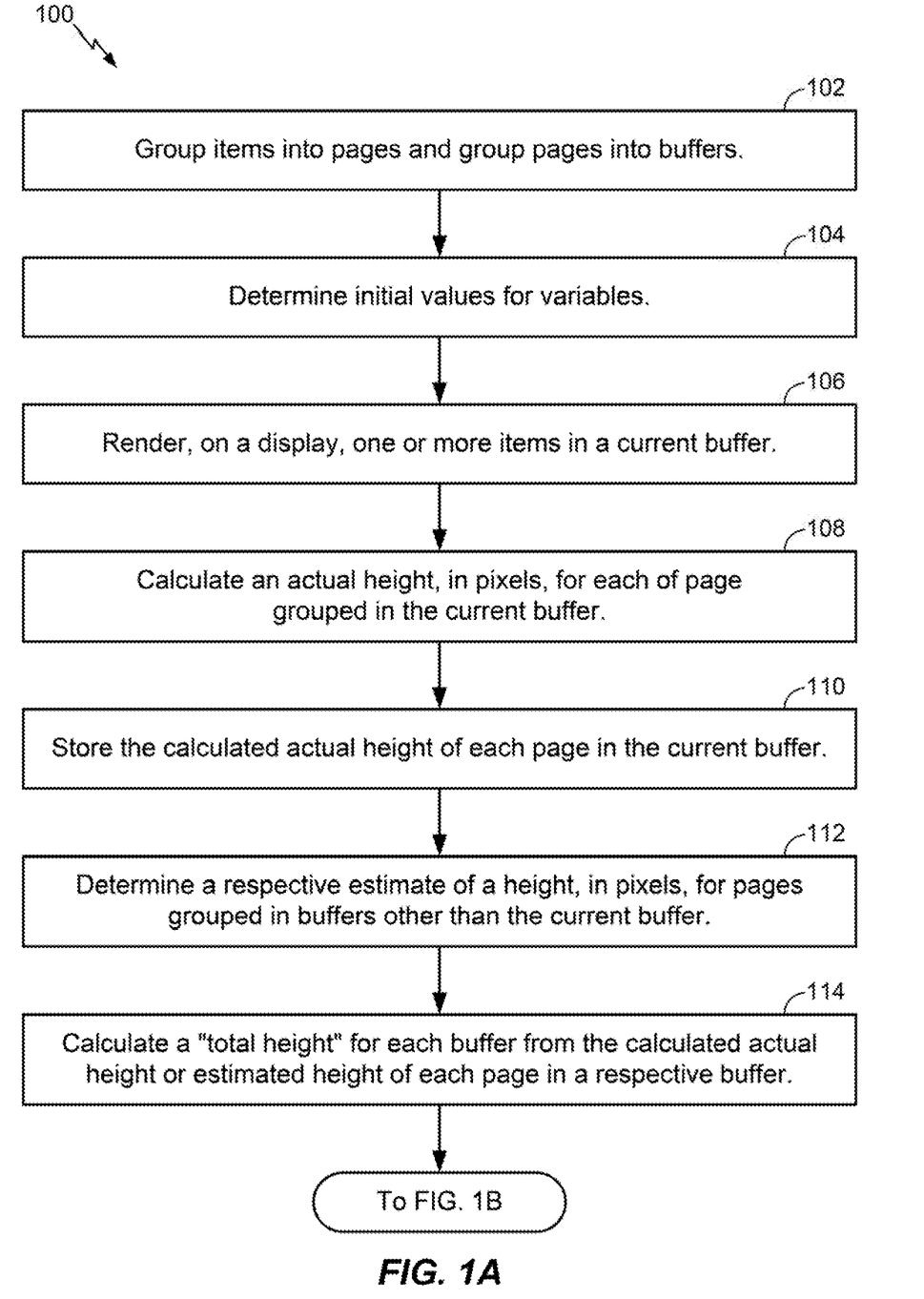
FIGS. 1A-1B depict a flowchart illustrating an example of a method for displaying elements of a scrollable list, according to an example of the disclosed subject matter.
Figure 1B:
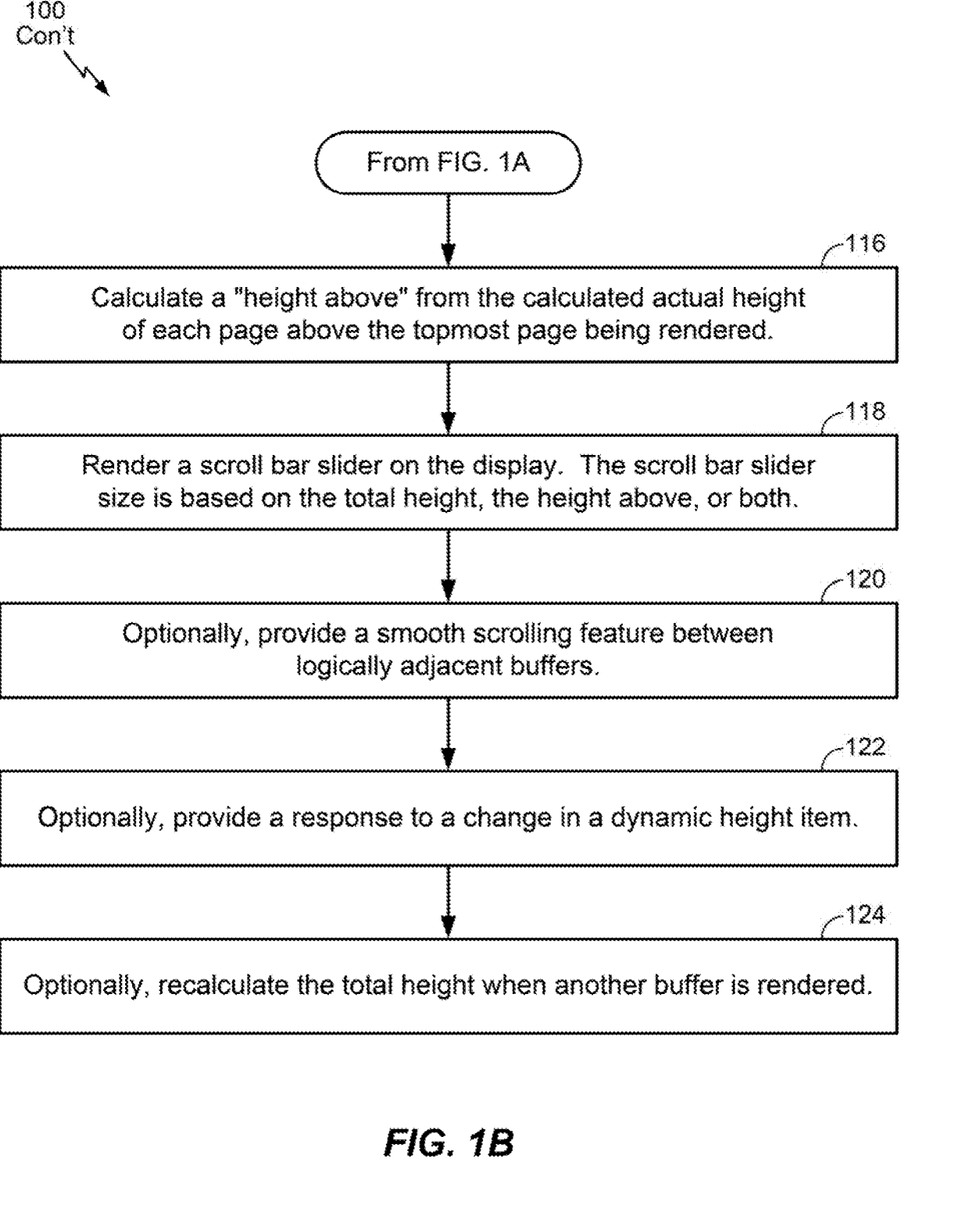

FIGS. 1A-1B depict a flowchart of an example method 100 to display a scrollable list of items on a display. In examples, the apparatus described herein, such as those described with reference to FIGS. 4-5, can be configured to perform at least in part of the method 100.

In optional block 102, items are received. An item can include data indicating: a social media post, a web post, a spreadsheet row, a review, a portion of a stream of content, an image, or a combination thereof. The items are capable of being rendered on a display, so that a user can view at least a portion of one or more of the items.

After being received, the items can be organized in a data structure and stored. Organizing can include grouping one or more items into a respective page. The pages aggregate and cache rendering details (e.g., an actual or estimated height of all items in the respective page). For example, one or more items can be grouped into a single page, while one or more other items can be grouped into another page. In an example, each item is grouped into one only page.

In an example, the items are organized in a data structure known as a list container, which is a single logical object that enables adding, searching and removing items. Using hypertext markup language (HTML), a document divisional element, <div>, can define a container, group items, and thus divide an HTML document into sections. The document division element can be added to a top of the list container, a bottom of the list container, or both. Empty spacer document division elements can be added to a top and a bottom of the list container to provide, during display of items in the container, an appearance to a user that all of the items are being rendered.

Figure 2:
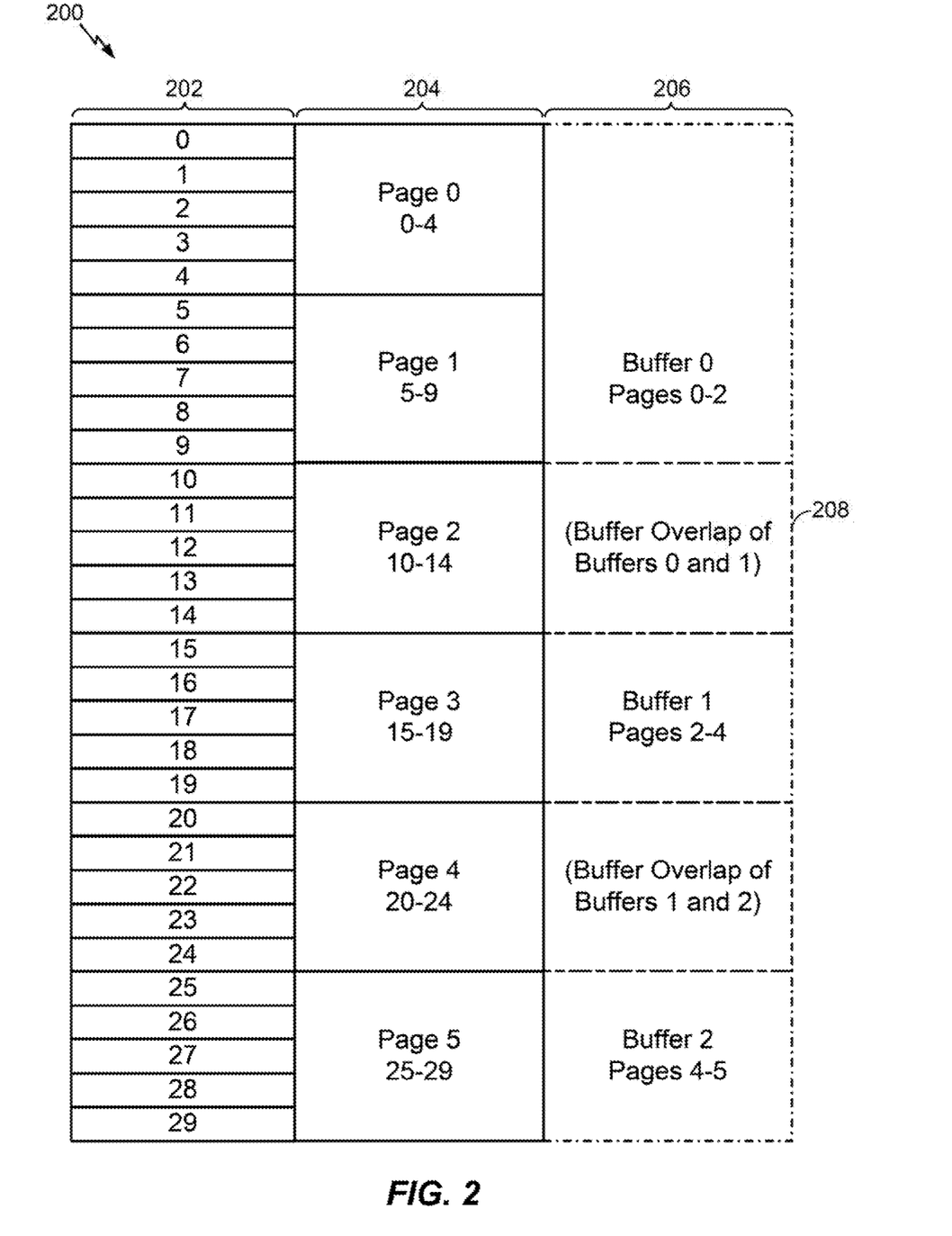
FIG. 2 shows an example of a data structure including items, pages, and buffers.

One or more pages can be grouped into a buffer. The buffers support bulk DOM operations (e.g., DOM rendering) and can be used to provide a user with smooth scrolling. A specific page can be grouped into one buffer, or, if two buffers are logically adjacent, the single page can be grouped into both buffers in a buffer overlap portion. FIG. 2 and the accompanying description provide a further example of grouping items into pages and pages into buffers.

In optional block 104, initial values for variables can be determined. For instance, an estimate of an initial "total height" of items in each page is determined and can be stored. A "height" can be a number of pixels, in a vertical direction, needed to display an item on a display. In an example, the estimate for the total height of items in each page can be determined for each page by multiplying a respective number of items on each page by a default fixed height. The fixed height can be in pixels.

A respective initial "height above" each page can be calculated for each page and can be stored. The initial height above a specific page is a total number of pixels of each page which can be rendered, on a display, in a position located above the specific page. The height above can be a sum of an actual number of pixels, an estimated number of pixels, or a function of both.

In block 106, one or more items in a current buffer are rendered (i.e., displayed) on the display. In an example, the items grouped in no more than one buffer are rendered at a time. The rendered items, and thus the current buffer, can be selected to be rendered by a scroll input. In other words, as a user scrolls the list up or down, a scroll input is received from a scrolling device, and the scroll input determines which items in the list (and thus which buffer) are rendered. Scrolling events can be monitored to determine which buffer should be the current buffer, and thus rendered.

The scrolling device originating the scroll input can be a mouse, a mouse wheel, a trackpad, a trackball, a touchscreen, a keyboard, a page up button, a page down button, an arrow key, an eye movement tracking device, a human interface device, or a combination thereof.

When the list of items is long, not all items can be rendered readily, for example because the display's resolution may be insufficient to display the entire list of items. Thus, using the provided techniques, the items not selected to be in view on the display are not rendered. In an example, by using these techniques there does not appear to a user to be a difference between reading thirty items versus reading 10,000 items. However, because all 10,000 items are not rendered to display a mere 30 items, there is a considerable savings in computing resources (e.g., CPU cycles) and energy, while user-perceived speed increases.

In block 108, an actual height, in pixels, is calculated for each of the pages grouped in the current buffer being rendered. The calculating of the actual height can be performed after the rendering the current buffer in block 106. An actual height for the current buffer can be determined by adding the respective actual heights for each of the items grouped in the current buffer.

In block 110, the calculated actual height of each page in the current buffer is stored. In an example, once the calculated actual height is stored, the actual height of each of the respective pages need not be recalculated unless there is a detected change to one or more of the items in the respective pages.

In block 112, a respective estimate of a height, in pixels, is determined for pages grouped in buffers other than the current buffer. In other words, for buffers that are not being rendered, the respective estimate of a height, in pixels, is determined for the pages grouped respectively therein. The determining of the respective estimate of the height of pages grouped in the buffers other than the current buffer can further include executing an externally-provided (e.g., user-provided and thus user-configurable) function for each item in the pages. Respective data for each item can be input to the function. In an example, if an actual page height has been calculated for a specific page grouped in a buffer other than the current buffer, the actual page height is not superseded by an estimated height. A respective estimated height for the other buffers can be determined by adding the respective estimated or actual heights of each page in each other buffer. As buffers are rendered, the buffers' respective calculated actual heights can replace a previously-determined respective estimated height.

In an example, all items have a fixed height and block 112 can be omitted if, for example, all page heights can be calculated using the fixed height.

In block 114, a "total height" is calculated from the calculated actual height or estimated height of each respective page. The total height can include a total height of all items in the list. A height of a full container can be set to the total height so that the display depicts what appears to be a long list, even though only a portion of the list is actually rendered.

In block 116, a page's "height above" is calculated from the calculated actual height of each respective page above the topmost page being rendered. A buffer's respective height above can be calculated by adding the calculated actual heights of each respective page above the topmost page being rendered. In an example having an upper buffer, an adjacent lower buffer, and a page in a buffer overlap region between the upper buffer and the lower buffer, the page in the buffer overlap region is not included in the calculation of the lower buffer's height above, as the page is in the lower buffer and thus not "above" the lower buffer.

As a user scrolls down the scrollable list, more buffers are rendered and the buffers' respective calculated actual heights replace a previously-determined respective estimated height, thus the total height converges toward a "true height" of the entire list. FIGS. 3A-3D and the associated description explain an example of changes to height calculations due to recalculating height as different buffers are rendered.

In block 118, a scroll bar slider is rendered on the display. The scroll bar slider's size can be based on the total height. For example, the scroll bar slider's size can be substantially inversely proportional to the total height. The scroll bar slider's position can be based on the height above, the total height, or a combination thereof. For example, the scroll bar slider's position can be substantially located based on the relation of the height above to the total height.

In optional block 120, a smooth scrolling feature between logically adjacent buffers is provided. The scroll input is analyzed to determine if an item being rendered is also grouped in a buffer adjacent to the current buffer. It can then be determined whether the scroll input indicates a transition to the adjacent buffer. If the item being rendered (e.g., a top-most item in a page, a bottom-most item in a page) is shared with the adjacent buffer and the scroll input indicates a transition to an item in the adjacent buffer, the adjacent buffer becomes the current buffer and the items in the adjacent buffer are rendered.

In a further example, it is determined if one of the items being rendered is also grouped in a different buffer and the scroll input indicates a transition to the different buffer. If the one of the items being rendered is also grouped in the different buffer and the scroll input indicates the transition to the different buffer, the items of the different buffer are rendered.

In optional block 122, provided is a response to a change in height of a dynamic height item. For example, a height of a dynamic height item can change due to a user interacting with an item, an "expand" button being pressed, an image loading, the like, or a combination thereof. For dynamic height items, the total height of the scrollable list is initially calculated using in block 114. This keeps rendering performance fast for large lists of items since DOM elements do not need to be created for items not in the current buffer, while taking into account the estimated heights to determine the total height, heights above, and starting position.

The change in height of the dynamic height item can be indicated as a result of monitoring the current buffer for any changes which may happen while the current buffer is being rendered. Monitoring indicates changes in a dynamic height item due to delayed image loading, low network speed, etc. in which an item may require time to be rendered to its actual height. In an example, every 100 ms, a height of a rendered page can be polled for a change. In an example, only rendered pages are monitored (e.g., polled). When a page is no longer rendered, event listeners for that page are removed.

When a change in height of a rendered dynamic height item is identified, the change in the height of the rendered item is received, and a main list view is notified of the change. The actual height, the height above, and the total height are recalculated using the changed height of the rendered item. The recalculated actual height replaces a previous actual page height or estimated page height for the respective page.

When dynamic height elements are present, buffer number and page position cannot be determined directly from a scroll position by using a simple formula (unlike in the fixed height case). Thus, a "last scroll" position indicating buffer number and page position is stored and can be used to determine a scroll direction and to provide a starting point from which to resume scrolling.

In optional block 124, the total height can be recalculated when one or more items in another buffer (e.g., a second buffer) are rendered. A respective actual height of each of the pages grouped in the second buffer is calculated. The total height is recalculated such that: 1) the total height is comprised of one or more actual values and one or more estimated values; and 2) the recalculated total height converges on a true height. The true height is an actual total height, in pixels, of all items in the list and is not based on an estimated height of any item.

The method 100 can be implemented using a host computing infrastructure. The host infrastructure can include at least a processor and a memory. A user interface operating at a user client device located remotely from the host infrastructure can communicatively interface with the host infrastructure via a public Internet. The host infrastructure can operate as a cloud-based service provider to the user client device.

FIG. 2 shows an example of a data structure 200 including items 202, pages 204, and buffers 206. The data structure 200 includes thirty items, has a pagesize of five, and has a buffersize of three. Thus, five different items are grouped per page. Each buffer includes three pages. In an example, referring to the data structure 200, only fifteen items 202 are rendered at a time. This number of displayed items is based on the pagesize (e.g., 5) multiplied by the buffersize (e.g., 3). The organization of the data structure 200 is an example, and is not limiting.

Buffer overlap 208 can be present between logically adjacent buffers. The buffer overlap 208 enables smooth rendering when transitioning between adjacent buffers as a source for the items to be rendered. Providing smooth rendering is an improvement over conventional techniques which can produce shaky rendering when scrolling. For example, referring to FIG. 2, buffer zero and buffer one are logically adjacent, and page two is included in both buffer zero and buffer one as a part of the buffer overlap 208. When page two in buffer zero is being rendered and the scroll input indicates a transition from buffer zero to buffer one, buffer one (which also includes page two) is then be rendered. Thus, because page two is rendered for both buffer zero and buffer one, a user does not perceive a difference, and the user perceives smooth scrolling of the items 202.

FIGS. 3A-3D show an example of changes to height calculations 300 due to recalculating heights as different buffers are rendered. Each of FIGS. 3A-3D show five different buffers 302, numbered from zero to four. A scrollable list is organized in pages 304 in the buffers 302. Each of the buffers 302 includes multiple pages 304. For example, buffer zero includes pages zero to two, buffer one includes pages two to four, buffer two includes pages four to six, buffer three includes pages six to eight, and buffer four includes pages eight and nine. FIGS. 3A-3D depict buffer overlap, as page two is in both buffer zero and buffer one, page four is in both buffer one and buffer two, page six is in both buffer two and buffer three, and page eight is in both buffer three and buffer four. Each of the buffers 302 also includes a respective "height above" value 306. Each of the buffers 302 also includes a respective buffer "height" value 308.

The buffers 302 and pages 304 are arranged such that the top of the scrollable list is organized in page zero in buffer zero, and is presented toward a top of a display of the scrollable list. The bottom of the scrollable list is organized in page nine in buffer four, and is presented toward a bottom of a display of the scrollable list. The organization of the data structure in FIGS. 3A-3D is an example, and is not limiting. For ease of explanation, FIGS. 3A-3D do not include items having heights that change after being rendered.

Figure 3A:
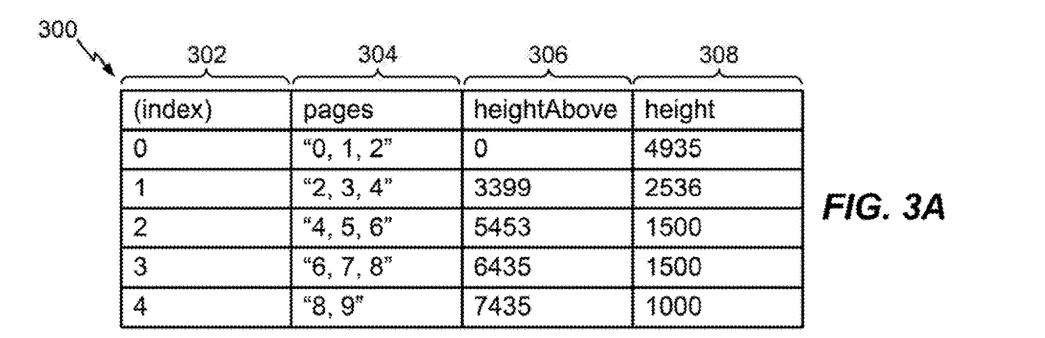
FIGS. 3A-3D show an example of changes to height calculations due to recalculating height as different buffers are rendered.

FIG. 3A depicts a state after buffer zero is rendered.

The rendering of buffer zero includes rendering pages zero to two, such as by performing block 106. FIG. 3A also depicts results from calculating an actual height, in pixels, for each of the pages (zero to two) grouped in the current buffer (zero) being rendered. Thus, buffer zero's respective height above equals zero pixels, as there are no pixels in the scrollable list above buffer zero. Buffer zero's actual height is calculated to be 4,935 pixels.

Buffer one's height above of 3,399 pixels is calculated from the actual heights of pages zero to one, as buffer one includes page two. Buffer one's height of 2,536 pixels is calculated from the actual height of page two added to estimated heights of pages three to four.

Buffer two's height above of 5,435 pixels is calculated from the actual heights of pages zero to two added to the estimated height of page three. Buffer two's height of 1,500 pixels is calculated from estimated heights of pages four to six.

Buffer three's height above of 6,435 pixels is calculated from the actual heights of pages zero to two added to estimated heights of pages three to five. Buffer three's height of 1,500 pixels is calculated from estimated heights of pages six to eight.

Buffer four's height above of 5,435 pixels is calculated from the actual heights of pages zero to two added to estimated heights of pages three to seven. Buffer four's height of 1,000 pixels is calculated from estimated heights of pages eight to nine.

Figure 3B:
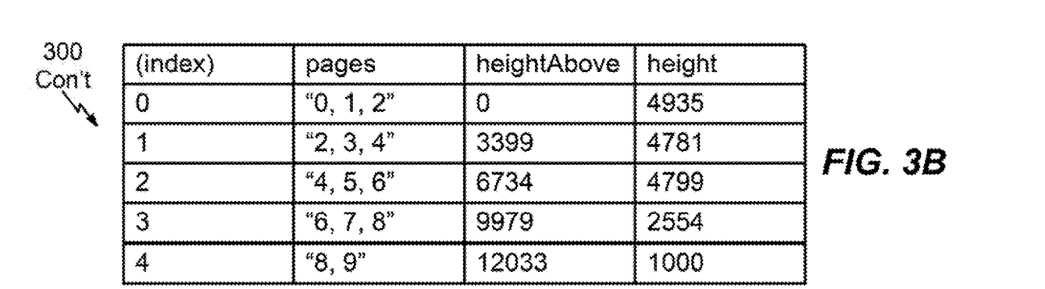

FIG. 3B depicts a state after buffer one is rendered.

Buffer zero's respective height above remains at zero pixels. Buffer zero's actual height remains at 4,935 pixels.

The rendering of buffer one includes rendering pages two to four. FIG. 3B also depicts results from calculating an actual height, in pixels, for each of the pages (two to four) grouped in the current buffer (one) being rendered. Buffer one's height above remains at 3,399 pixels. Buffer one's height of 4,781 pixels is a sum of calculated actual heights of pages two to four.

Buffer two's height above of 6,734 pixels is calculated from the actual heights of pages zero to three. Buffer two's height of 4,799 pixels is calculated from the actual height of page four added to estimated heights of pages five to six.

Buffer three's height above of 9,979 pixels is calculated from the actual heights of pages zero to four added to an estimated height of page five. Buffer three's height of 2,554 pixels is calculated from estimated heights of pages six to eight.

Buffer four's height above of 12,033 pixels is calculated from the actual heights of pages zero to four added to estimated heights of pages five to seven. Buffer four's height of 1,000 pixels is calculated from estimated heights of pages eight to nine.

Figure 3C:
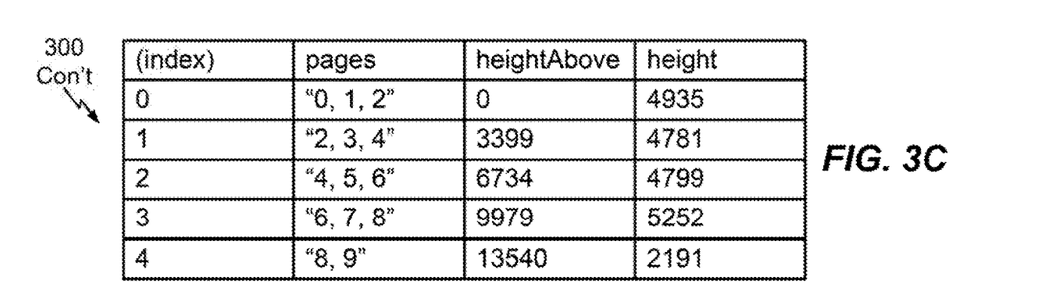

FIG. 3C depicts a state after buffer three is rendered.

Buffer zero's respective height above value remains at zero pixels. Buffer zero's actual height remains at 4,935 pixels.

Buffer one's respective height above value remains at 3,399 pixels, and buffer one's actual height remains at 4,781 pixels.

Buffer two's respective height above value remains at 6,734 pixels, and buffer two's actual height remains at 4,799 pixels.

The rendering of buffer three includes rendering pages six to eight. FIG. 3C also depicts results from calculating an actual height, in pixels, for each of the pages (six to eight) grouped in the current buffer (three) being rendered. Buffer three's height above remains at 9,979 pixels. Buffer three's height of 5,252 pixels is a sum of calculated actual heights of pages six to eight.

Buffer four's height above of 13,540 pixels is calculated from the actual heights of pages zero to seven. Buffer four's height of 2,191 pixels is calculated from the actual height of page eight added to an estimated height of page nine.

Figure 3D:
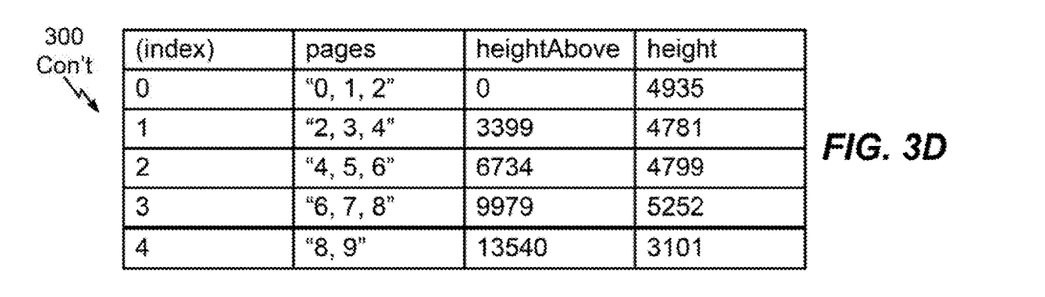

FIG. 3D depicts a state after buffer four is rendered.

Buffer zero's respective height above remains at zero pixels. Buffer zero's actual height remains at 4,935 pixels.

Buffer one's respective height above remains at 3,399 pixels and buffer one's actual height remains at 4,781 pixels.

Buffer two's respective height above remains at 6,734 pixels and buffer two's actual height remains at 4,799 pixels.

Buffer three's height above value remains at 9,979 pixels and buffer three's actual height remains at 5,252 pixels.

The rendering of buffer four includes rendering pages eight to nine. FIG. 3D also depicts results from calculating an actual height, in pixels, for each of the pages (eight to nine) grouped in the current buffer (four) being rendered. Buffer four's height above of 13,540 pixels remains from the prior calculation of the actual heights of pages zero to seven. Buffer four's height of 3,101 pixels is calculated from the actual heights of pages eight to nine. Once the calculations for buffer four are complete, heights of pages zero to nine are calculated and not estimates, thus all buffer heights 308 and heights above 306 are true heights and not based on estimates.

Figure 4:
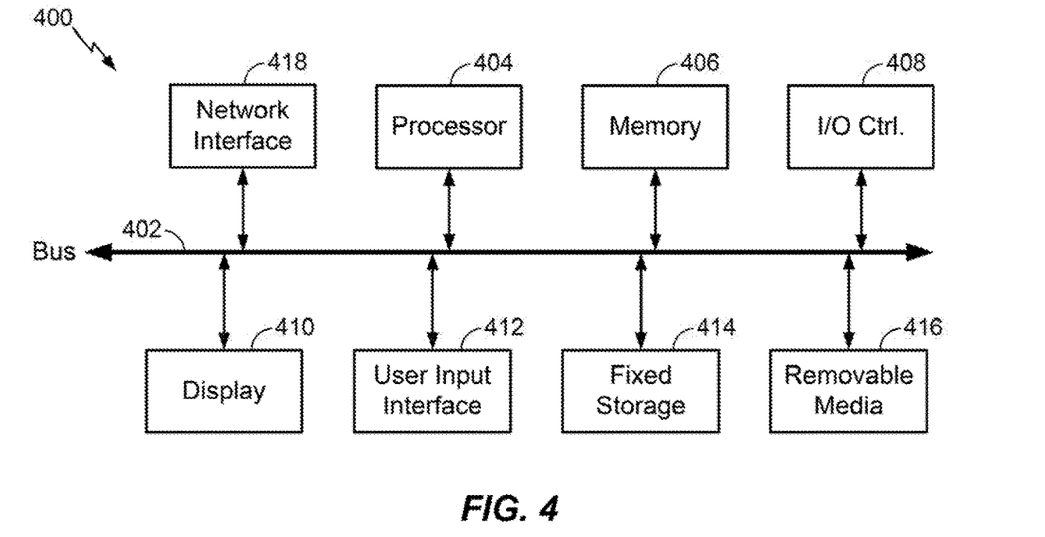
FIG. 4 shows a computer, according to an example of the disclosed subject matter.

Examples of the presently disclosed subject matter can be implemented in and used with a variety of component and network architectures, and are not necessarily limited to a multi-tenant system. FIG. 4 is an example of a computer 400 suitable for implementations of the presently disclosed subject matter. At least one element of the computer 400 can be configured to perform at least a portion of a method described herein. The example of the computer as shown in FIG. 4 can be a client device, a remote platform, or a server on which the disclosed systems and methods can be performed.

As shown in FIG. 4, the computer 400 includes a bus 402 which interconnects major components of the computer 400, such as a central processor 404, a memory 406 (typically RAM, but which can also include ROM, flash RAM, or the like), an input/output controller 408, a display 410, such as a display screen via a display adapter, a user input interface 412, which can include one or more controllers and associated user input devices such as a keyboard, mouse, and the like, and can be closely coupled to the I/O controller 408, fixed storage 414, such as a hard drive, flash storage, Fiber Channel network, SAN device, SCSI device, and the like, and a removable media component 416 operative to control and receive an optical disk, flash drive, the like, or a combination thereof.

The bus 402 allows data communication between the central processor 404 and the memory 406, which can include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 400 are generally stored on and accessed via a computer readable medium, such as a hard disk drive (e.g., fixed storage 414), an optical drive, floppy disk, or other storage medium.

The fixed storage 414 can be integral with the computer 400 or can be separate and accessed through other interfaces. A network interface 418 can provide a direct connection to a remote server via a wired or wireless telephone link, a cable link, an optical fiber link, a satellite link or the like, to the Internet via an Internet service provider (ISP), or a direct connection to a remote server via a direct network link to the Internet via a POP (point of presence) or other technique. The network interface 418 can provide such connection using wireless techniques, including digital cellular telephone connection, Cellular Digital Packet Data (CDPD) connection, digital satellite data connection or the like. For example, the network interface 418 can allow the computer to communicate with other computers via one or more local, wide-area, or other networks, as shown in FIG. 5.

Many other devices or components (not shown) can be connected in a similar manner (e.g., document scanners, digital cameras and so on). Conversely, not all of the components shown in FIG. 4 need be present to practice the present disclosure. The components can be interconnected in different ways from that shown. The operation of a computer such as that shown in FIG. 4 is readily known in the art and is not discussed in detail in this application. Code (i.e., instructions) configured to implement the present disclosure can be stored in computer-readable storage media such as one or more of the memory 406, fixed storage 414, removable media 416, or on a remote storage location.

Figure 5:
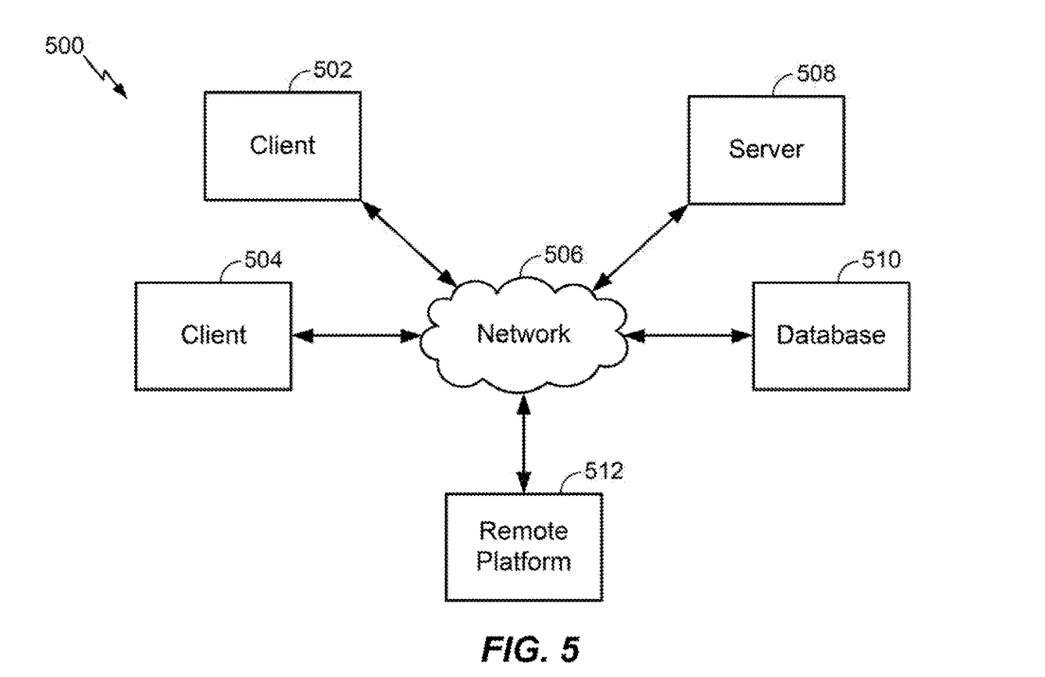
FIG. 5 shows a network configuration, according to an example of the disclosed subject matter.

FIG. 5 shows an example network 500 according to an example of the disclosed subject matter. At least one element of the example network 500 can be configured to perform at least a portion of a method described herein. One or more clients 502 and/or 504, such as local computers, smart phones, tablet computing devices, and the like can connect to other devices via one or more networks 506. The network 500 can be a local network, wide-area network, the Internet, or any other suitable communication network or networks, and can be implemented on any suitable platform including wired and/or wireless networks. The clients can communicate with one or more servers 508 and/or databases 510. The devices can be directly accessible by the clients 502, 504, or one or more other devices can provide intermediary access such as where the server 508 provides access to resources stored in the database 510. The clients 502, 504 also can access a remote platform 512 or services provided by the remote platform 512 such as cloud computing arrangements and services. The remote platform 512 can include the one or more servers 508 and/or the database 510. At least a part of a methods described herein can be performed on one or more of the servers, databases, remote platforms, or client devices in various examples within the scope of the disclosed subject matter.

The provided systems and methods can be implemented as a multi-tenant system. A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

The system can include a server that can generate one or more virtual applications based on data stored in a common database shared between the tenants. Each virtual application can provide access to data in the database for each of the one or more tenants utilizing the system. A tenant can, for example, request social media posts, metadata, and/or analytics provider data. Although multiple tenants can share access to a common server and database, the particular data and services provided from the system to each tenant can be securely isolated from those provided to other tenants. The multi-tenant architecture therefore allows different sets of users to share functionality without necessarily sharing their private data. Similarly, the appearance of the interface of each tenant with the system can be unique.

More generally, various examples of the presently disclosed subject matter can include or be implemented in the form of computer-implemented processes and apparatuses for practicing those processes. Examples also can be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing examples of the disclosed subject matter. Examples also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing examples of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Examples can be implemented using hardware that can include a processor, such as a general purpose microprocessor and/or an Application Specific Integrated Circuit (ASIC) that implements all or part of the techniques according to examples of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to examples of the disclosed subject matter.

Within this description, the singular portends the plural where practicable. This description, for purpose of explanation, has been described with reference to specific examples. However, the illustrative discussions are not intended to be exhaustive or to limit examples of the disclosed subject matter to the precise forms disclosed. Many modifications and variations are possible in view of the above teachings. The examples were chosen and described to explain the principles of examples of the disclosed subject matter and their practical applications, to thereby enable others skilled in the art to utilize those examples as well as various examples with various modifications as may be suited to the particular use contemplated.

The invention claimed is:

1. A method for displaying a scrollable list of items on a display, the method comprising:
   rendering, on the display, items in the list, wherein the rendered items are grouped in pages in a current buffer in a plurality of buffers, the rendered items are selected to be rendered by a scroll input, and the items in no more than one buffer are rendered at a time;
   monitoring the current buffer for any changes while the current buffer is being rendered, wherein the monitoring determines changes in a dynamic height item based on an interaction with the rendered items;
   calculating an actual height, in pixels, of each of the pages grouped in the current buffer;
   storing the calculated actual height of each page in the current buffer;
   determining a respective estimate of a height, in pixels, of pages grouped in buffers other than the current buffer;
   calculating a total height from the calculated actual height or estimated height of each respective page;
   receiving a change in a height of a rendered item in the list of rendered items based on an interaction with the rendered item;
   recalculating, using the change in the height of the rendered item, the actual height of each of the pages grouped in the current buffer and the total height;
   rendering a scroll bar slider on the display, wherein the scroll bar slider's size is based on the total height;
   determining, based on the scroll input, that a top-most item being rendered is also grouped in an adjacent buffer to the current buffer, wherein the adjacent buffer includes a plurality of pages;
   determining whether the scroll input indicates a transition to the adjacent buffer; and
   rendering the items in the adjacent buffer when the top-most item is shared with the adjacent buffer.

2. The method of claim 1, further comprising:
   receiving one or more input items;
   adding the received one or more input items to a list container; and
   grouping the input items in the list container into a respective page in the current buffer.

3. The method of claim 2, further comprising adding a document division element to a top of the list container, a bottom of the list container, or both.

4. The method of claim 1, wherein one or more of the pages in the current buffer includes respective data indicating the total height of respective items grouped in each page, and the total height of the respective items grouped in each page is estimated or actual.

5. The method of claim 1, wherein the method is implemented using a host computing infrastructure, the host infrastructure including at least a processor and a memory, a user interface operates at a user client device located remotely from the host infrastructure and communicatively interfaces with the host infrastructure via a public Internet, and the host infrastructure operates as a cloud-based service provider to the user client device.

6. The method of claim 1, wherein the calculating the actual height of each of the pages grouped in the current buffer is performed after the rendering the current buffer.

7. The method of claim 1, further comprising:
   rendering one or more items in a second buffer in the plurality of buffers;
   calculating a respective actual height of each of the pages grouped in the second buffer; and
   recalculating the total height such that:
      the total height is comprised of one or more actual values and one or more estimated values; and
      the recalculated total height converges on a true height.

8. The method of claim 1, wherein:
   the determining the respective estimate of the height of pages grouped in the buffers other than the current buffer further comprises executing an externally-provided function for each item in the pages; and
   respective data for each item is input to the function.

9. The method of claim 1, further comprising:
   updating each page with a respective total height, in pixels, of pages above; and
   updating, based on the calculated actual height of each page in the current buffer, a list of heights above each buffer.

10. The method of claim 1, further comprising:
    determining an estimate of an initial total height of items in each page;
    storing the initial total height of items;
    calculating an initial height above each page; and
    storing the initial height above each page.

11. A system for displaying a scrollable list of items on a display, the system comprising:
    a processor; and
    a memory communicably coupled to the processor, wherein the memory includes computer instructions configured to cause the processor to:
       render, on the display, items in the list, wherein the rendered items are grouped in pages in a current buffer in a plurality of buffers, the rendered items are selected to be rendered by a scroll input, and the items in no more than one buffer are rendered at a time;
       monitor the current buffer for any changes while the current buffer is being rendered, wherein the monitoring determines changes in a dynamic height item based on an interaction with the rendered items;
       calculate an actual height, in pixels, of each of the pages grouped in the current buffer;
       store the calculated actual height of each page in the current buffer;
       determine a respective estimate of a height, in pixels, of pages grouped in buffers other than the current buffer;
       calculate a total height from the calculated actual height or estimated height of each respective page;
       receive a change in a height of a rendered item in the list of rendered items based on an interaction with the rendered item;
       recalculate, using the change in the height of the rendered item, the actual height of each of the pages grouped in the current buffer and the total height;
       render a scroll bar slider on the display, wherein the scroll bar slider's size is based on the total height;
       determine, based on the scroll input, that a top-most item being rendered is also grouped in a buffer adjacent to the current buffer, wherein the adjacent buffer includes a plurality of pages;
determine whether the scroll input indicates a transition to the adjacent buffer; and
render the items in the adjacent buffer when the top-most item is shared with the adjacent buffer.

12. The system of claim 11, wherein the computer instructions further comprise computer instructions configured to cause the processor to:
receive one or more input items;
add the received one or more input items to a list container; and
group the input items in the list container into a respective page in the current buffer.

13. The system of claim 12, wherein the computer instructions further comprise computer instructions configured to cause the processor to add a document division element to a top of the list container, a bottom of the list container, or both.

14. The system of claim 11, wherein one or more of the pages in the current buffer includes respective data indicating the total height of respective items grouped in each page, and the total height of the respective items grouped in each page is estimated or actual.

15. The system of claim 11, wherein:
the system is implemented using a host computing infrastructure;
the host infrastructure includes at least the processor and the memory;
a user interface operates at a user client device located remotely from the host infrastructure and communicatively interfaces with the host infrastructure via a public Internet; and
the host infrastructure operates as a cloud-based service provider to the user client device.

16. The system of claim 11, wherein the calculating the actual height of each of the pages grouped in the current buffer is performed after the rendering the current buffer.

17. The system of claim 11, wherein the computer instructions further comprise computer instructions configured to cause the processor to:
render one or more items in a second buffer in the plurality of buffers;
calculate a respective actual height of each of the pages grouped in the second buffer; and
recalculate the total height such that:
the total height is comprised of one or more actual values and one or more estimated values; and
the recalculated total height converges on a true height.

18. The system of claim 11, wherein:
the determining the respective estimate of the height of pages grouped in the buffers other than the current buffer further comprises executing an externally-provided function for each item in the pages; and
respective data for each item is input to the function.

19. The system of claim 11, wherein the computer instructions further comprise computer instructions configured to cause the processor to:
update each page with a respective total height, in pixels, of pages above; and
update, based on the calculated actual height of each page in the current buffer, a list of heights above each buffer.

20. The system of claim 11, wherein the computer instructions further comprise computer instructions configured to cause the processor to:
determine an estimate of an initial total height of items in each page;
store the initial total height of items;
calculate an initial height above each page; and
store the initial height above each page.

21. A non-transitory computer-readable storage medium comprising instructions stored thereon which are configured to cause a processor in a host organization to perform operations, wherein the operations include:
rendering, on a display, items in a list of items, wherein the rendered items are grouped in pages in a current buffer in a plurality of buffers, the rendered items are selected to be rendered by a scroll input, and the items in no more than one buffer are rendered at a time;
monitoring the current buffer for any changes while the current buffer is being rendered, wherein the monitoring determines changes in a dynamic height item based on an interaction with the rendered items;
calculating an actual height, in pixels, of each of the pages grouped in the current buffer;
storing the calculated actual height of each page in the current buffer;
determining a respective estimate of a height, in pixels, of pages grouped in buffers other than the current buffer;
calculating a total height from the calculated actual height or estimated height of each respective page;
receiving a change in a height of a rendered item in the list of rendered items based on an interaction with the rendered item;
recalculating, using the change in the height of the rendered item, the actual height of each of the pages grouped in the current buffer and the total height;
rendering a scroll bar slider on the display, wherein the scroll bar slider's size is based on the total height;
determining, based on the scroll input, that a top-most item being rendered is also grouped in an adjacent buffer to the current buffer, wherein the adjacent buffer includes a plurality of pages;
determining whether the scroll input indicates a transition to the adjacent buffer; and
rendering the items in the adjacent buffer when the top-most item is shared with the adjacent buffer.

22. The non-transitory computer readable storage medium of claim 21, wherein the operations further include:
receiving one or more input items;
adding the received one or more input items to a list container; and
grouping the input items in the list container into a respective page in the current buffer.

23. The non-transitory computer readable storage medium of claim 22, wherein the operations further include:
adding a document division element to a top of the list container, a bottom of the list container, or both.

24. The non-transitory computer readable storage medium of claim 21, wherein one or more of the pages in the current buffer includes respective data indicating the total height of respective items grouped in each page, and the total height of the respective items grouped in each page is estimated or actual.

25. The non-transitory computer readable storage medium of claim 21, wherein the operations are implemented using a host computing infrastructure, the host infrastructure including at least the processor and a memory, a user interface operates at a user client device located remotely from the host infrastructure and communicatively interfaces with the host infrastructure via a public Internet, and the host infrastructure operates as a cloud-based service provider to the user client device.

26. The non-transitory computer readable storage medium of claim 21, wherein the calculating the actual height of each of the pages grouped in the current buffer is performed after the rendering the current buffer.

27. The non-transitory computer readable storage medium of claim 21, wherein the operations further include:
   rendering one or more items in a second buffer in the plurality of buffers;
   calculating a respective actual height of each of the pages grouped in the second buffer; and
   recalculating the total height such that:
      the total height is comprised of one or more actual values and one or more estimated values; and
      the recalculated total height converges on a true height.

28. The non-transitory computer readable storage medium of claim 21, wherein:
   the determining the respective estimate of the height of pages grouped in the buffers other than the current buffer further comprises executing an externally-provided function for each item in the pages; and
   the operations further include inputting, to the function, data for each item.

29. The non-transitory computer readable storage medium of claim 21, wherein the operations further include:
   updating each page with a respective total height, in pixels, of pages above; and
   updating, based on the calculated actual height of each page in the current buffer, a list of heights above each buffer.

30. The non-transitory computer readable storage medium of claim 21, wherein the operations further include:
   determining an estimate of an initial total height of items in each page;
   storing the initial total height of items;
   calculating an initial height above each page; and
   storing the initial height above each page.

* * * * *